July 8, 1958
P. E. BESSIERE
2,842,690
EDDY CURRENT APPARATUS AND IN PARTICULAR
IN EDDY CURRENT BRAKES
Filed June 15, 1956
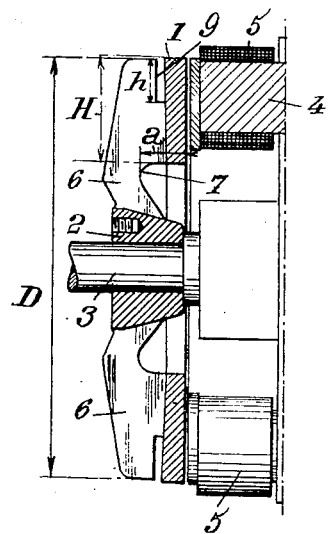
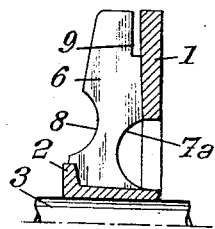 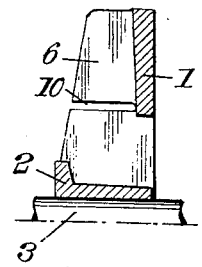
INVENTOR
Pierre Etienne Bessiere
BY
ATTORNEYS

United States Patent Office 2,842,690
Patented July 8, 1958

2,842,690

EDDY CURRENT APPARATUS AND IN PARTICULAR IN EDDY CURRENT BRAKES

Pierre Etienne Bessiere, Paris, France, assignor to Compagnie Telma, Paris (Seine), France, a society of France Application June 15, 1956, Serial No. 591,746

Claims priority, application France June 22, 1955

6 Claims. (Cl. 310—93)

The present invention relates to eddy current apparatus including at least one annular armature made of a magnetic material, rotatable about its axis in the magnetic field created by an inductor system located on only one side of said armature, whereby relative rotation of said armature about said axis produces eddy currents in said armature. Preferably, such apparatus include two annular armature discs fixed on the same shaft and at a distance from each other, the inductor system being housed in the interval between these two annular discs.

The invention is more especially concerned with brakes or slowing down apparatus of this kind, for vehicles, hoisting machines, mine sounding apparatus, etc.

The chief object of my invention is to provide an apparatus of this kind which is better adapted to meet the requirements of practice and, in particular, which is better capable of resisting the deforming effects of the heat given off therein during their operation.

According to my invention, said annular armature is connected with a hub coaxial therewith through flat arms extending in planes passing through said axis, said arms being located on the other side of said annular armature from said inductor system, said arms being provided with notches positioned and dimensioned to make said arms resiliently deformable in response to deformations of said armature by heating caused by said eddy currents.

Preferred embodiments of my invention will be hereinafter described with reference to the accompanying drawings, given merely by way of example and in which:

Fig. 1 is a diagrammatic half-section view of an eddy current brake apparatus made according to a first embodiment of my invention.

Figs. 2 and 3 are partial views showing two modifications.

The brake device of Fig. 1 includes two annular discs such as 1 respectively connected, as it will be hereinafter described, each to a hub 2 fixed on a common shaft 3. The annular discs 1 which constitute the armature are made of a magnetic material and the whole of discs 1, hubs 2 and shaft 3 constitute the rotor. The inductor system is constituted by a row of cores 4 surrounded by windings 5 and housed in the space between discs 1, this inductor system belonging to the stator.

Up to the present time, in such apparatus, each disc 1 was connected with its hub 2 through rigid rays which carried, on the other side of the annular disc from the inductor system, cooling fins extending as far as the periphery of said annular discs 1.

Now, when the brake is in operation, the rotor is heated and the temperatures are distributed in a heterogeneous fashion therein. Thermal expansions are therefore also distributed in a heterogeneous fashion, which causes permanent deformations, in particular in the disc, which are detrimental of a good operation.

In order to obviate this drawback, according to my invention and as illustrated by Fig. 1, annular disc 1 is connected to hub 2 through flat arms 6 extending in planes passing through the axis of shaft 3, said arms being in contact with annular disc 1 only on the outer face thereof, that is to say on the other side thereof from the inductor system 4, and each of said arms is provided with a notch 7 extending from the inner periphery of annular disc 1 to a point of hub 2 located substantially in the same plane as the outer face of disc 1.

These notches serve to provide bending of the arm in the plane of the arm, i. e. in an axial plane of the machine.

Of course the dimensions of arms 6 and of their notches depend upon the size of the disc and the nature of the metal of which it is made. By way of indication, for a disc of soft steel the outer diameter D of which is 424 mm., the depth $a$ of the notch from the inner face of disc 1 must be at least 35 mm., and preferably averages 45 mm. The thickness of the arms must be at most 10 mm., and preferably averages 6 mm.

In the construction illustrated by Fig. 2, each arm 6 is provided not only on the edge thereof closer to the inductor system 4 with a notch 7a analogous to the notch 7 of Fig. 1, but also on the other edge with a notch 8. In this case, the depth of notch 7a may be slightly smaller than that of notch 7 of Fig. 1.

It may be further advantageous to provide other notches such as 9 located on the same edge of each arm 6 as notches 7 and 7a but in the region thereof close to its outer end. Advantageously, the height $h$ of each notch 9 is at least equal to one fourth of the height H of disc 1; preferably $h$ is equal to one third of H.

The presence of this groove or notch 9 enables disc 1 to expand without imparting permanent deformations to arms 6. As a matter of fact, the inner face of disc 1 is heated much more quickly than its outer face so that when disc 1 expands under the effect of heat, it takes a frusto-conical shape which tends to reduce the distance between the inner face of disc 1 and the edge of arms 6 at the periphery without imparting excessive stresses to arms 6.

In the construction of Fig. 3, the notches provided in arms 6 are in the form of grooves extending in a direction substantially parallel to the axis of shaft 3 and over practically the whole width of each arm 6, that is to say as far as the inner face of disc 1, said grooves 10 being preferably located opposite the inner periphery of disc 1.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An eddy current apparatus which comprises, in combination, a single inductor capable of creating a magnetic field, at least one annular armature made of a magnetic material rotatable about its axis with respect to said inductor in said field, said armature being located on one side of said inductor, a hub for supporting said armature, and a plurality of flat arms interposed between said hub and said armature, said flat arms extending at least substantially in axial planes of the armature and being located on the other side of said annular armature from said inductor system, each of said arms being provided with at least one notch for locally reducing the dimension of the corresponding arm parallel to said axis to make said arms resiliently deformable in response to deformations of said armature by heating caused by eddy currents created in said armature when it is rotating in said field.

2. An apparatus according to claim 1 in which each of said arms is provided with a notch in the edge of said arm nearer to said inductor system and between said hub and said annular armature.

3. An apparatus according to claim 1 in which each of said arms is provided, in its edge closer to said armature system, with two notches, one located between said hub and said annular armature and the other located at the peripheral end portion of said blade, so as to leave a gap between said blade and the outer peripheral portion of said annular armature.

4. An apparatus according to claim 2 in which each of said blades is further provided with a notch in the opposite edge of said arm.

5. An apparatus according to claim 3 in which each of said blades is further provided with a notch in the opposite edge of said arm.

6. An apparatus according to claim 1 in which each of said arms is provided with a narrow notch parallel to said axis and extending from the edge of said arm farther from said inductor system to a point close to the outer face of said annular armature.

References Cited in the file of this patent

UNITED STATES PATENTS

| | | |
|---|---|---|
| 2,733,361 | Bessiere | Jan. 31, 1956 |
| 2,774,895 | Zuckermann | Dec. 18, 1956 |

FOREIGN PATENTS

| | | |
|---|---|---|
| 282,876 | Great Britain | Dec. 28, 1927 |
| 1,026,998 | France | Feb. 11, 1953 |